United States Patent [19]

Brown

[11] Patent Number: 5,050,925
[45] Date of Patent: Sep. 24, 1991

[54] VEHICLE PROTECTIVE COVER

[76] Inventor: Larry E. Brown, 9724 E. 73rd St. South, Apt. 308, Tulsa, Okla. 74133

[21] Appl. No.: 532,117

[22] Filed: May 30, 1990

Related U.S. Application Data

[63] Continuation of Ser. No. 241,591, Sep. 8, 1988, abandoned.

[51] Int. Cl.$^5$ .............................................. B60R 19/00
[52] U.S. Cl. ...................................... 296/136; 293/128
[58] Field of Search ......................... 293/1, 128, 102; 296/136, 97, 8; 150/166; 280/770

[56] References Cited

U.S. PATENT DOCUMENTS

| | | | |
|---|---|---|---|
| 3,147,176 | 9/1964 | Haslam | 161/39 |
| 3,309,129 | 3/1967 | Newman et al. | 293/1 |
| 3,472,546 | 10/1969 | Samuels | 293/1 |
| 3,563,594 | 2/1971 | London | 150/166 X |
| 3,582,134 | 6/1971 | Shaff | 296/146 |
| 3,659,887 | 5/1972 | Marquette | 293/1 |
| 4,014,583 | 3/1977 | Forbes | 293/128 |
| 4,041,999 | 8/1977 | Miller | 296/136 X |
| 4,127,294 | 11/1978 | Cooper | 293/128 X |
| 4,493,502 | 1/1985 | Campbell, Jr. | 293/128 |
| 4,530,519 | 7/1985 | Marshall | 296/128 |
| 4,531,560 | 7/1985 | Balanky | 150/52 K |
| 4,727,920 | 3/1988 | Siegler | 296/97.8 X |
| 4,750,767 | 6/1988 | Barnett | 293/128 |
| 4,773,456 | 9/1988 | Rodgers | 296/136 X |
| 4,810,015 | 3/1989 | McNeil | 293/128 |
| 4,884,824 | 12/1989 | Radke | 293/128 X |

FOREIGN PATENT DOCUMENTS 2564393  11/1985  France .................. 293/128

Primary Examiner—Margaret A. Focarino
Assistant Examiner—Joseph D. Pape
Attorney, Agent, or Firm—Head & Johnson

[57] ABSTRACT

A removable protective padding for preventing chips, dents, scrapes and nicks to the doors and sides of a parked vehicle which is covered by this protective padding. This padding will extend from just front of the front door edge to just in front of the rear wheel well. It is held in position by magnets. The height of the protective pad is typically about twenty inches and covers only the area most susceptible to damage from the opening of doors of adjacently parked vehicles. The plastic is a clear plastic such as polyvinyl chloride. It is placed on the car side when it is parked and is removed when it is to be driven.

6 Claims, 2 Drawing Sheets

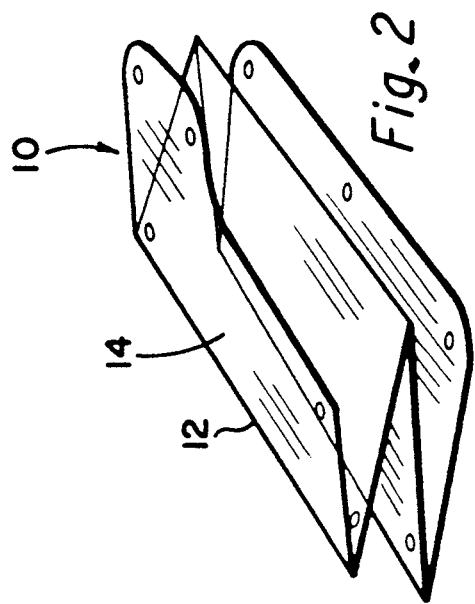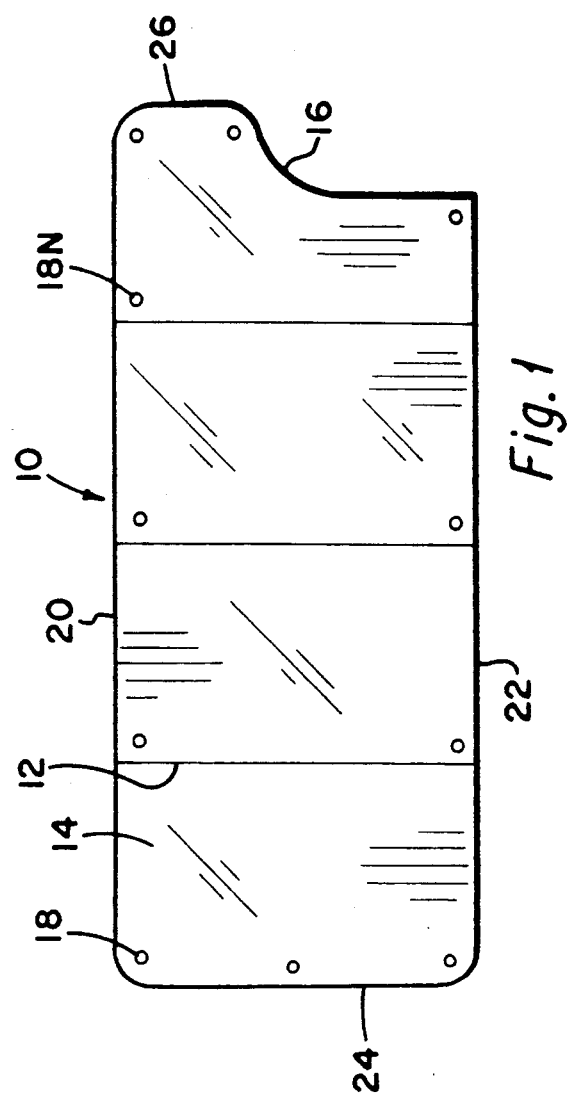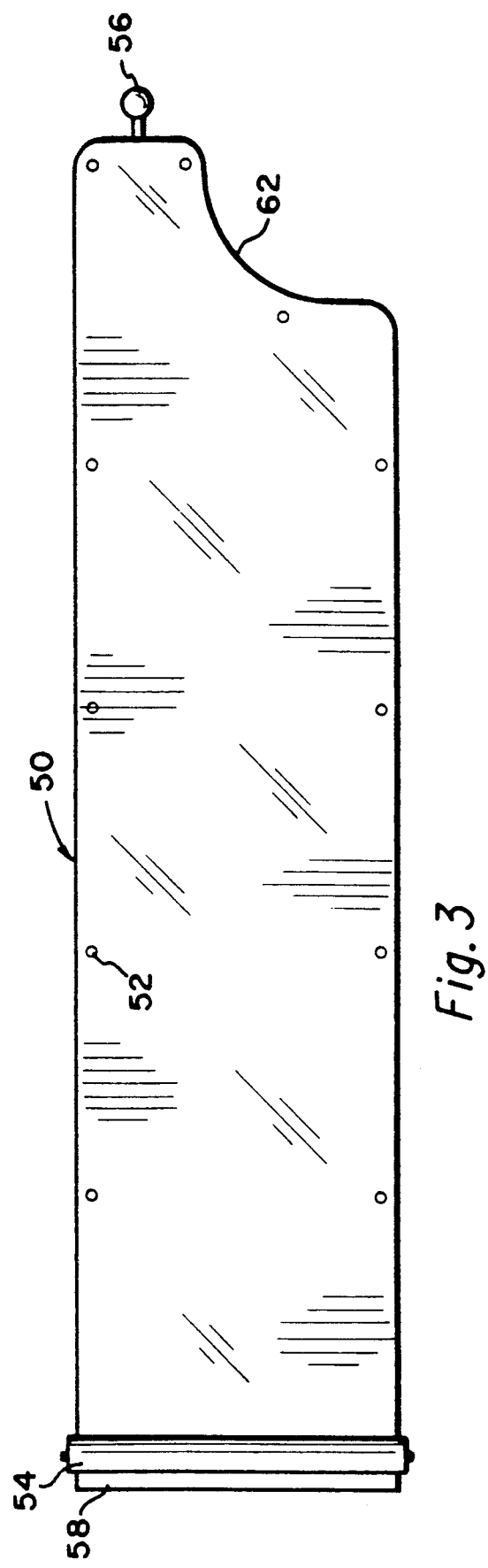

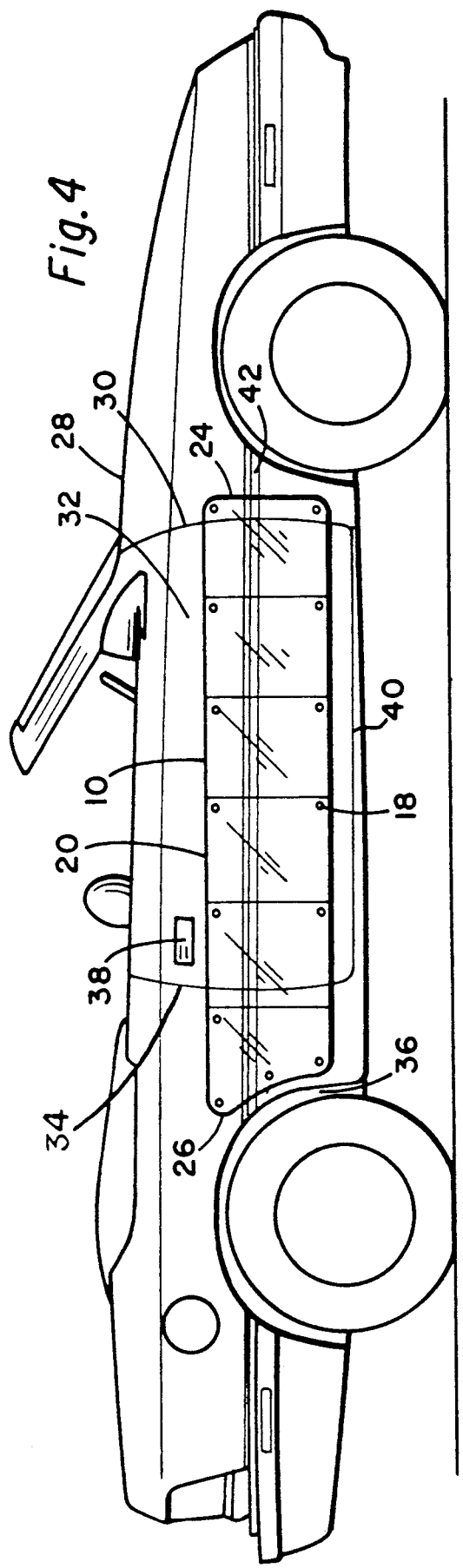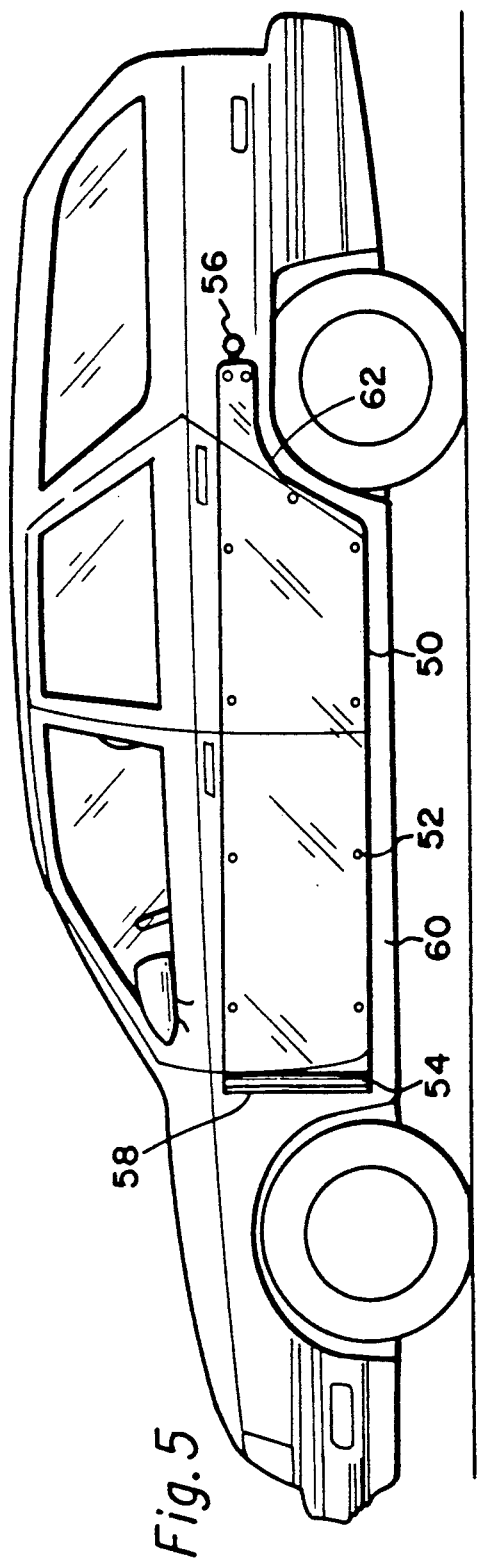

VEHICLE PROTECTIVE COVER

This is a continuation of copending application Ser. No 07/241,591 filed on Sep. 8, 1988, now abandoned.

BACKGROUND OF THE INVENTION

This invention relates to a protective padding for protecting the sides of a car.

Essentially nearly every adult in America owns an automobile. Essentially all of these automobiles will at numerous times, be parked in parking lots where cars are parked side by side. There is probably not a car that has been parked in parking lots any significant number of times that has not been struck by the door of an adjacent car as it is being opened. This impact of a door as it is being opened will chip paint, cause indentations and so forth on a parked car. Anyone who has received such a dent or chip on his or her car will undoubtedly say I wish I had a method or system or something to prevent this. This is especially true when one has a brand new car and it gets that first dent.

It is thus an object of this invention to provide a portable easily attached and removable padding or side protector to protect car doors from such dents and chips.

SUMMARY OF THE INVENTION

A clear plastic padding is removably attached to the side of a car and extends from just in front of the front edge of the front door to adjacent the rear wheel well. The material is clear so that it will not distract from whatever the color of the car may be. The height of the materials is such as to cover those areas which are most susceptible to being damaged by the opening of a door of an adjacently parked car. It has been found that the height of about twenty inches is appropriate for most cars. This height is typically about one-half to two-thirds of the height from the bottom of the door to the bottom of the door window. A particularly good material is polyvinyl chloride with a thickness of 0.080.

The protective padding is held onto the body of the car by magnets which have been secured to the padding. In one embodiment the padding has a series of creases so that the padding may be folded quickly and neatly into a small pack and stored under the front seat of an automobile. In another embodiment the protective covering is installed in a spring loaded roller. The spring loaded roller is attached to the car with magnets, for example, and the protective polyvinyl chloride is withdrawn and attached to the side of the car. When it is desired to remove the protective covering the padding is released from the side of the car and is permitted to again be rolled up by spring loaded roller into the roller assembly.

BRIEF DESCRIPTION OF THE DRAWINGS

FIG. 1 illustrates a plan view of a side protector padding of my invention with serrations therein.

FIG. 2 illustrates the padding of FIG. 1 in a folded position.

FIG. 3 illustrates the protective padding of my invention attached to a roller assembly.

FIG. 4 illustrates the padding of FIG. 1 mounted on the side of an automobile.

FIG. 5 illustrates the padding of FIG. 3 attached to the side of an automobile.

DETAILED DESCRIPTION

Attention is first directed to FIG. 1 which shows the side protector 10 having a plurality of crimps 12 dividing the side protector into a plurality of sections 14. These crimps 12 permit the side protector to be folded into the position shown in FIG. 2 The side protector has a cut-away wheel portion 16 which provides for the wheel well when attached to a car. The protector pad has a plurality of magnets 18 through 18N which are spaced along the top edge 20, bottom edge 22, front end 24 and rear end 26. These magnets can be flat, disc like magnets and may be placed on the inner side of the protective pad and with a small vinyl chloride patch covering it. The patch is then heat sealed to the pad so that the magnet is sealed in place. The height, that is the distance along edge 24 between top edge 20 and bottom edge 22, is preferably about twenty inches. This on most cars will be between about one-half to two-thirds of the distance from the bottom of the doors to the bottom of the door window. When one considers the contour of the doors of a modern automobile this has been found to protect the areas of the door which are most susceptible to damage by the opening of a door of an adjacent parked car. Twenty inches has been found to be a universally acceptable height.

In order to serve most automobiles it has been found that the length of the side protector can be in a short, medium and long models. For the length along edge 20 and 22 is shown in the following chart for three separate size side protectors that will serve essentially all cars.

| SIZE | LENGTH ALONG TOP EDGE 20 | LENGTH ALONG BOTTOM EDGE 22 |
| --- | --- | --- |
| SHORT | 50" | 45" |
| MEDIUM | 65" | 60" |
| LONG | 80" | 70" |

The side protector 10 is made of a clear plastic material in the range of 0.015 inches to 0.080 inches thick. This permits one side protector to be used with any and all color cars and be rather inconspicuous. A very suitable material is polyvinyl chloride which is 0.080 inches thick. Thinner plastics might be used but would not give the protection which is needed. This 0.080 inches thick polyvinyl chloride will protect the car against nearly all contacts of cars from adjacently parked car and essentially even all of the most severe impacts. The height of the side protector is also such that it will be in the path of essentially all doors opened from adjacently parked cars. It is therefore seen that it give much more protection than the rather narrow side protectors which are normally metal and about one-half inches wide which is seen in a large number of cars.

Attention is next directed to FIG. 4 which shows an automobile 28 upon which the side protector 10 has been placed. It is seen that the front edge 24 is just in front of the front edge 30 of door 32. The rear end 26 is extended behind the rear edge 34 of the door 32 and stops just short of the wheel well 36. The side protector is held onto the metal side by magnets 18. The height of the protector is such that the top edge 20 is just below door handle 38 and slightly above bottom edge 40 of door 32. The side protector 10 then is seen to protect essentially all the vulnerable area of the side of the car. It is indicated the door is normally convex with the point extending the farthest out from the center of the car is along the lines 42. When not in use, the side protector is folded as shown in FIG. 2 and is stored under the seat of the car. When one parks the car one merely takes out the folded pad and unfolds it and attaches it in the position shown in FIG. 4. The side of the car is then protected from impact from opening of the door of an adjacently parked car. When the car is to be driven again the pad is quickly removed, folded up into the position shown in FIG. 2 and then placed under the car seat.

FIG. 3 shows another embodiment of my side protector. The material and length of this is essentially the same as that described above in regard to FIG. 1. Shown in FIG. 3 is a side protector 50 which has a plurality of attaching magnets 52. The storage of this side protector is different from that of the device in FIG. 1. This includes a roller assembly 54 which can be quite similar in principle to the rollers on shades for windows in homes. A knob 56 is provided as a handle. A suction cup may be attached to knob 56. A special magnetic bar 58 is provided on the roller assembly 54. The side protector of FIG. 3 will be carried in the automobile in a stored position with the side protector 50 completely within roll assembly 54. When it is desired to use the side protector on a car for protection one merely picks up the assembly and as shown in FIG. 5 magnetic bar 58 is attached to the side of the car just in front of the front of door 60. Then by the use of knob 56 the side protector 50 is withdrawn from the roll assembly 54. It is pulled out until the wheel well 62 is in the position substantially as shown in FIG. 5. The magnets 52 holds the side protector 50 in position. When it is desired to drive the automobile, the magnets are pulled away from the side of the car and the side protector 50 is permitted to roll within the roller assembly 54. The roller assembly 54 can then be removed and placed in storage inside the car for use at a later time.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What I claim is:

1. A side protector for an automobile having at least one door having a bottom edge, a front edge and a rear edge, a door window having a bottom edge and a rear wheel well, the side protector comprising:

a portable, integral, clear plastic sheet of material of a length to extend from just in front of the front edge of said door to at least partially across the rear wheel well and having bottom and rear edges contoured to the rear wheel well and of a height which is substantially less than the distance from the bottom edge of the door to the bottom edge of the door window; and magnet means for holding said integral sheet of plastic material to the automobile.

2. A side protector as defined in claim 1 in which said plastic material is polyvinyl chloride which is approximately 0.080 inches thick.

3. A side protector as defined in claim 1 in which there are a plurality of crimps in said plastic material so that it may be folded.

4. A side protector as defined in claim 1 in which there is included:

a roller assembly onto or from which said material may be rolled or expended with a front edge of said material freely abutting a surface of said roller assembly along the length thereof.

5. A side protector as defined in claim 4 in which said plastic material is polyvinyl chloride.

6. A side protector as defined in claim 5 in which said polyvinyl chloride is between about 0.015 to 0.080 inches.

* * * * *